United States Patent [19]

Cramer

[11] Patent Number: 4,952,333

[45] Date of Patent: Aug. 28, 1990

[54] BLEACHING AND BRIGHTENING COMPOSITION AND METHOD

[75] Inventor: Randall J. Cramer, Hayward, Calif.

[73] Assignee: The Clorox Company, Oakland, Calif.

[21] Appl. No.: 338,365

[22] Filed: Apr. 11, 1989

Related U.S. Application Data

[63] Continuation of Ser. No. 220,977, Jul. 18, 1988, abandoned, which is a continuation of Ser. No. 96,749, Sep. 16, 1987, abandoned, which is a continuation of Ser. No. 748,306, Jun. 24, 1985, abandoned, which is a continuation-in-part of Ser. No. 574,565, Jan. 27, 1984, abandoned.

[51] Int. Cl.[5] .......... A01N 27/00

[52] U.S. Cl. .......... 252/187.24; 8/101; 106/414; 106/499; 252/186.1; 252/187.25; 252/187.26

[58] Field of Search .......... 106/414, 499; 524/581; 252/187.24, 187.25, 187.26, 186.1; 8/101

[56] References Cited

U.S. PATENT DOCUMENTS

| | | | |
|---|---|---|---|
| 3,393,153 | 7/1968 | Zimmerer et al. | 252/95 |
| 3,494,784 | 2/1970 | Coene et al. . | |
| 3,645,911 | 2/1972 | Van Besauw et al. . | |
| 3,655,566 | 4/1972 | Robinson et al. | 252/95 |
| 3,663,442 | 5/1972 | Briggs . | |
| 3,666,680 | 5/1972 | Briggs . | |
| 3,684,722 | 8/1972 | Hynam et al. . | |
| 3,689,421 | 9/1972 | Briggs | 252/95 |
| 3,691,090 | 9/1972 | Kitajima et al. . | |
| 3,701,763 | 10/1972 | Wada et al. . | |
| 3,850,899 | 11/1974 | Wada et al. . | |
| 3,855,178 | 12/1974 | White et al. . | |
| 3,878,037 | 4/1975 | Hansen et al. . | |
| 3,956,165 | 5/1976 | Hansen et al. . | |
| 3,975,280 | 8/1976 | Hachmann et al. | 252/102 |
| 3,988,343 | 10/1976 | Lilyouist | 524/89 |
| 3,992,317 | 11/1976 | Brichard et al. | 252/186 |
| 4,009,139 | 2/1977 | Widder et al. | 252/89 R |
| 4,049,845 | 9/1977 | Lozier et al. | 427/68 |
| 4,058,480 | 11/1977 | Lohmann et al. | 252/39.21 |
| 4,071,463 | 1/1978 | Steinhauer | 252/103 |
| 4,072,624 | 2/1978 | Croome et al. | 252/301.35 |
| 4,151,104 | 4/1979 | Alvarez et al. | 252/99 |
| 4,174,289 | 11/1979 | Sorgenfrei et al. | 252/103 |
| 4,269,740 | 5/1981 | Woods et al. | 260/4 R |
| 4,271,030 | 6/1981 | Brierley et al. | 252/98 |
| 4,334,933 | 6/1983 | Abe et al. | 106/305 |
| 4,457,855 | 7/1984 | Sudbury et al. | 252/98 |
| 4,526,700 | 7/1985 | Hensley et al. | 252/102 |

FOREIGN PATENT DOCUMENTS

| | | |
|---|---|---|
| 0009250 | 2/1980 | European Pat. Off. . |
| 0128619 | 12/1984 | European Pat. Off. . |
| 121546 | 1/1985 | Japan . |
| 1113348 | 5/1968 | Netherlands . |
| 1329086 | 8/1970 | United Kingdom . |
| 1230438 | 5/1971 | United Kingdom . |
| 1384907 | 2/1975 | United Kingdom . |
| 1485643 | 9/1977 | United Kingdom . |
| 1518569 | 7/1978 | United Kingdom . |
| 1564189 | 4/1980 | United Kingdom . |
| 1568836 | 6/1980 | United Kingdom . |
| 1572353 | 7/1980 | United Kingdom . |
| 1574824 | 9/1980 | United Kingdom . |
| 1587210 | 4/1981 | United Kingdom . |
| 1588270 | 4/1981 | United Kingdom . |
| 1596988 | 9/1981 | United Kingdom . |
| 1601083 | 10/1981 | United Kingdom . |

OTHER PUBLICATIONS

Chem. Abs. No. 125941t, vol. 91, Goto et al., Japanese Patent Kokai 7950510, Apr. 20, 1979.

Findley, W. R., "Whitener Selection for Today's Detergents," J. Amer. Oil Chem. Soc. 60 (7), pp. 1367–1369 (Jul. 1983).

*Primary Examiner*—Amelia Burgess Yarbrough
*Attorney, Agent, or Firm*—Majestic, Parsons, Siebert & Hsue

[57] ABSTRACT

Liquid bleaching and brightening compositions are provided in which a polymeric matrix stably suspends a fluorescent whitening agent, and, optionally, pigment particles. A particularly preferred composition includes an aqueous solution having sodium hypochlorite in an amount of from about 3.5 wt. % to about 6.2 wt. %, an anionic or nonionic surfactant in an amount of from about 0.03 wt. % to about 0.3 wt. %, a polymer in an amount of from about 0.3 wt. % to about 2.0 wt. %, a fluorescent whitening agent in an amount of from about 0.01 wt. % to about 0.2 wt. %, and, if desired, ultramarine blue particles in an amount of from about 0.01 wt. % to 0.2 wt. %, the fluorescent whitening agent and ultramarine blue particles being stably suspended and dispersed in the aqueous solution via the polymer.

9 Claims, No Drawings

BLEACHING AND BRIGHTENING COMPOSITION AND METHOD

This is a continuation of application Ser. No. 220,977, filed July 18, 1988, which is a continuation of application Ser. No. 976,749, filed Sept. 16, 1987, which is a continuation of application Ser. No. 748,306 filed June 24, 1985, which is a continuation-in-part of application Ser. No. 574,565 filed Jan. 27, 1984, all now abandoned.

Field of the Invention

The present invention generally relates to liquid compositions useful in treating fabrics, and particularly relates to liquid bleaching solutions having stably suspended bluing agents and fluorescent whitening agents therein.

BACKGROUND ART

A variety of substantially water insoluble particulates are known and useful in treating fabrics. For example, fluorescent whitening agents, also known as optical brighteners, or brighteners, which are adsorbed onto textile fibers and impart to the fabric an improved degree of whiteness or brightness (fluorescence) by means of their chemical ability to absorb ultraviolet radiation and re-emit visible radiation, have found widespread use as components of household detergent compositions. In order to provide substantial fabric whitening, it is desirable to combine the optical brightening capacity of fluorescent whitening agents with an effective bleach. Fluorescent whitening agents are, however, very reactive and generally unstable in liquid chlorine bleaches. The prior art has failed to provide a stable product incorporating fluorescent whitening agents in a liquid chlorine bleach.

U.S. Pat. No. 3,393,153 to Zimmerer et al. discloses the use of an oxidized polyethylene emulsion as a stabilizing agent for dispersions of fluorescent whitening agents in bleach. These emulsions, however, have been shown to substantially lack both physical and chemical stability.

Problems of physical and chemical stability are compounded when particulate pigments, or bluing agents, such as ultramarine blue, are also incorporated into the bleach composition. Bluing agents deposit on a fabric surface and, in contrast to optical brighteners, reflect blue light while absorbing yellow light. Although addition of bluing agents in conjunction with laundering additives is a desirable means of treating fabrics, it has been difficult to sufficiently stably suspend the bluing agents, particularly in a strongly oxidizing environment such as hypochlorite bleach, while retaining water dispersibility of the solution.

U.S. Pat. No. 4,271,030, issued June 2, 1981, inventors Brierley et al., discloses a liquid hypochlorite bleach having a particulate pigment, such as ultramarine blue, which is said to be stably suspended in the composition by means of a flocculant, such as calcium soap flocs and amine oxides, filling at least 50% of the volume of the composition; and, U.S. Pat. No. 3,663,442, issued May 16, 1972, inventor Briggs, discloses liquid bleaching compositions having a finely particulate terpolymer which imparts opacity to the compositions.

However, prior known compositions with particulates in aqueous solutions have posed sedimentation, coagulation or stability problems or have not found commercial acceptability as dual bleaching and bluing compositions. Co-pending application Ser. No. 574,565, filed Jan. 27, 1984, is addressed to stabilizing bluing agents in chlorine bleach compositions; this application, as noted above, relates to stabilizing both optical brighteners and bluing agents in chlorine bleach compositions.

SUMMARY OF THE INVENTION

Accordingly, it is an object of the present invention to provide a simple and efficient method for stably suspending fluorescent whitening agents as well as stably suspending substantially inert and water insoluble particulate agents such as bluing agents, for treating fabrics in aqueous solutions, particularly bleaching solutions, with the solutions being readily dispersed during laundering to provide both bleaching and brightening, as well as coloring or bluing, of the fabrics treated.

Additional objects, advantages, and novel features of the invention will be set forth in part in the description which follows, and in part will become apparent to those skilled in the art on examination.

In one aspect of the present invention, a composition useful for treating fabrics is provided which comprises an aqueous solution, a fluorescent whitening agent, and a polymer dispersed in the aqueous solution which forms a matrix in which the fluorescent whitening agent is entrapped. The amount of fluorescent whitening agent is present in an amount of preferably about 0.01 wt.% to 1.0 wt.%, more preferably about 0.01 wt.% to about 0.2 wt.%. The polymer is present preferably in an amount of from about 0.015 wt.% to about 11.0 wt.%, more preferably in an amount ranging from about 0.3 wt.% to about 2.0 wt.%. The aqueous solution preferably has from about 0.1 wt.% to about 15 wt.% of a hypochlorite salt, more preferably from about 1 wt.% to about 10 wt.% of a hypochlorite salt, and the polymer is preferably an oxidized polyethylene or a polyethylene-acrylic acid copolymer. A bluing agent such as ultramarine blue may also be added, which together with the fluorescent whitening agent, is entrapped within the polymer matrix. The amount of bluing agent is preferably from about 0.01 wt.% to 1.0 wt.%, and more preferably, ranges from about 0.01 wt.% to about 0.2 wt.%.

In another aspect of the present invention, a method for producing a bleaching, brightening, and bluing composition is provided which comprises the steps of admixing a quantity of molten polymer with base, contacting the molten polymer in the presence of an anionic or a nonionic surfactant with an aqueous solution to form an emulsion, dispersing a quantity of a fluorescent whitening agent and a quantity of particulate ultramarine blue in the emulsion, and adding a water soluble salt, such as sodium hypochlorite or sodium chloride, until the emulsion collapses with the polymer forming a matrix in which particles of brightener and ultramarine blue are entrapped. If desired, the bluing agent may be omitted from the composition.

A preferred liquid composition of the invention has sodium hypochlorite in an amount of from about 3.5 wt.% to about 6.2 wt.%, an anionic or nonionic surfactant in an amount of from about 0.03 wt.% to about 0.3 wt.%, a polymer derived from oxidized polyethylene or polyethylene-acrylic acid copolymer in an amount of from about 0.3 wt.% to about 2.0 wt.%, a fluorescent whitening agent in an amount of from about 0.01 wt.% to about 0.2 wt.%, and ultramarine blue particles in an amount of from about 0.01 wt.% to about 0.2 wt.%. The polymer stably suspends and disperses the fluorescent whitening agent and the ultramarine blue particles in the liquid composition. When the preferred composition is used, as by adding to wash water, then the polymer releases the fluorescent whitening agent and ultramarine blue particles, which deposit on clothing being washed to mask undesirable yellowing following laundering.

BEST MODE OF CARRYING OUT THE INVENTION

Broadly, the present invention provides liquid compositions which include a dispersed polymer forming a matrix in which substantially water insoluble particles, including brighteners and, if desired, bluing agents, are entrapped. The particles are substantially evenly distributed throughout the composition and are suspended therein by means of the polymer.

Suitable brighteners which can be used in the practice of the present invention include compounds which are substantially resistant to chlorine bleaches and which will deposit onto cotton fabric. Particularly suitable compounds include the disodium salt of 2,2-(4,4'-biphenylene divinylene)-dibenzenesulfonic acid (manufactured and sold under the name Tinopal CBS-X by Ciba-Geigy Corporation of Greensboro, N,C.; "Tinopal" is a registered trademark of Ciba-Geigy) having the structure

FORMULA 1

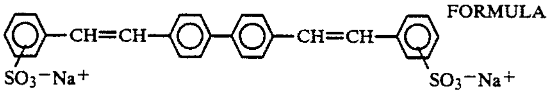

and Phorwite BHC 766 (manufactured by Mobay Corporation of Union, N.J.; "Phorwite" is a registered trademark of Mobay Corporation) which has the following structure:

FORMULA 2

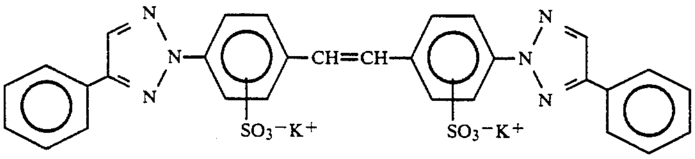

Alkaline earth, alkali metal, zinc, and other multivalent salts (such as the metals of Group IIIA of the periodic table of the elements (e.g., $Al^{+3}$)) of these compounds are also suitable brightening agents, as are the fluorescent whitening agents disclosed in U.S. Pat. No 3,393,153 to Zimmerer, et al., previously incorporated by reference Concentration of brightener in the bleach composition is particularly preferably between 0.01 wt.% and about 0.2 wt.%; an especially preferred concentration is approximately 0.1 wt.%.

It had previously been believed that stable suspension of fluorescent whitening agents in hypochlorite solution was not possible (see, e.g., W. R. Findley, Whitener Selection for Today's Detergents, J. Amer. Oil Chem. Soc. 60(7), p. 1369 (July 1983)). In fact, none of the methods disclosed in the prior art have been successful in providing a stable suspension of brightener in hypochlorite solution. For example, U.S. Pat. No. 3,393,153 to Zimmerer, et al., the disclosure of which is hereby incorporated by reference in its entirety, sets forth liquid bleaching agents which are stated to include stably suspended fluorescent whitening agents. However, comparative testing conducted by the inventor of the instant invention illustrated that substantial chemical stability is not achieved by the Zimmerer et al. methodology. The present invention, in surprising contrast to the prior art, provides a composition which is substantially chemically stable.

The bleach composition of the present invention, may include stably suspended bluing agents or related compounds in addition to optical brighteners. Suitable compounds for suspending in compositions of the present invention are substantially inert in the liquid solution, and include various known pigments For example, suitable pigments include aluminosilicates, such as the ultramarines (red, green, violet and blue), zeolites, and simple metal oxides (such as titanium dioxide and chromium dioxide).

Bluing agents useful in the present invention are substantially water insoluble and often have a higher density than the aqueous solutions in which they are desirably dispersed for fabric treatment. For example, ultramarine blue has a density of 2.35 g/cc, and ultramarine blue particles begin settling out of aqueous solution within about four hours, even when the particles are of very small size.

Density of bluing agent in the bleach solution, however, is not believed to be a critical factor in the present invention, as the inventive compositions do not rigorously follow Stokes' law. Thus, bluing agents suitable for the present invention may have densities which are either higher or lower than the liquid solution. Particle size will generally be from about 0.5 to about 50 microns, preferably from about 0.5 to about 2 microns. Compositions of the invention will typically have relatively low viscosity (about 20 to about 60 centipoise, or 0.02 to 0.06 pascal second), and thus are readily poured or dispensed for use. Preferred compositions have a pH of at least about 11, preferably a pH of at least about 12.5. These high pH's appear necessary to promote optimum physical and chemical stability of these bleach compositions. To achieve these high pH's, it is preferred to add a source of caustic, preferably sodium hydroxide. Preferred amounts are from about 0.01 to about 5.0 wt.%, more preferably from about 0.5 wt.% to about 2.0 wt.%, and most preferably from about 1.0 to about 1.75 wt.%. While sodium hydroxide is preferred, other alkali metal hydroxides (e.g., potassium hydroxide, lithium hydroxide) are suitable. Alkali metal carbonates and silicates may also provide the proper high pH.

Particularly preferred concentration of bluing agent ranges from about 0.01 wt.% to about 0.2 wt.%, and an especially preferred concentration is about 0.05 wt.%. Bluing agents for use in the practice of the present invention are effective as composition colorants in addition to providing effective masking of the yellow cast of laundered fabric. Thus, in addition to the pigments listed above, suitable compounds that may be substituted for functional bluing agents include nonfunctional colorants such as anthraquinone dyes.

Suitable polymers for practice of the present invention form a matrix which is dispersed in an aqueous solution and which entraps the particulate. Preferred polymers include modified polyethylenes, such as oxidized polyethylenes and polyethylene-acrylic acid copolymers, which have melting points in the range of about 90° C. to about 120° C.

Oxidized polyethylenes suitable for the present invention may vary considerably in structure. One suitable oxidized polyethylene has the general formula shown by Formula 3, below, where "R" may be hydrogen or alkyl groups. The ether and ester functionalities may be linear (as illustrated by Formula 3) or be intramolecularly bonded ring structures. The oxidized polyethylenes typically have a molecular weight of about 400 to about 3000 and have acid numbers from about 30 to about 120.

FORMULA 3

$$HO-\overset{O}{\overset{\|}{C}}(CH_2)_x\overset{O}{\overset{\|}{C}}(CH_2)_yO(CH_2)_z\overset{O}{\overset{\|}{C}}-OR$$

wherein the total of x, y and z is from about 35 to about 250.

It is particularly preferred to use polyethylene-acrylic acid copolymers which are slightly branched polyethylene chains containing no oxygen functionality other than carboxyl groups, and have the general structure illustrated by Formula 4, below. Molecular weight is typically below about 10,000, and more preferably ranges from about 500 to about 6000, and the copolymers have acid numbers ranging from about 25 to about 160. Particularly preferred copolymers have acid numbers ranging from about 30 to about 70.

FORMULA 4

$$R\text{+}CH_2CH_2\text{)}_x\text{+}CH_2\overset{COOH}{\overset{|}{C}H}\text{)}_yH$$

wherein the total of x and y is from about 12 to about 195, and R may be hydrogen or carboxyl.

Preparation of compositions in accordance with the present invention includes forming an emulsion of suitable polymer with an anionic or a nonionic surfactant. The amount of surfactant used is preferably from about 0.01 wt% to about 6.0 wt.%, more preferably from about 0.03 wt.% to about 0.3 wt.%. The emulsified polymer forms a discontinuous, internal phase which is dispersed in the continuous, external aqueous phase.

Suitable anionic surfactants, or emulsifying agents, include soaps (such as are produced from reacting fatty acids with alkalis or amine compounds), sulfates, sulfonates and phosphates. Suitable nonionic surfactants include polyoxyethylene and polyoxypropylene derivatives, fatty alkanol amides and fatty amine oxides.

The emulsion is preferably prepared by melting the oxidized polyethylene or polyethylene acid copolymer with a solution of the surfactant and with base, and then slowly adding boiling water to the melt. At emulsion inversion point, the viscosity of the composition drops and additional boiling water may be added to adjust the emulsion to a desired weight percent of total solids. A quantity of either bluing agent or both fluorescent whitening agent and bluing agent is then dispersed into the emulsion, preferably with the dispersed bluing agent and brightener being in a weight ratio with respect to the emulsified polymer of from about 1:1.5 to about 1:8. If fluorescent whitening agent only is dispersed, a ratio of about 1:1.5 to 1:3 is preferred, and is more preferably about 1:2.5.

Saponification and/or neutralization of the molten polymer is performed prior to formation of the emulsion, preferably with elevated pressure. (The oxidized polyethylene is both saponified and neutralized. The polyethylene-acrylic acid copolymer is neutralized.) Smooth addition of boiling water preceding the emulsion inversion point provides a uniform dispersion. Cooling of the emulsion to room temperature is preferably at a rapid rate (by means, for example, of a cooling jacket on the emulsion kettle).

Following preparation of a suitable emulsion, the selected particulate is then admixed, preferably at a mix rate of about 100 to 300 rpm, forming a simple, physical mixture. A water soluble salt is added until the emulsion collapses (due to increased ionic strength of the solution). Addition of the water soluble salt is preferably by adding a hot (about 21° C. to about 40° C.) aqueous solution in which the salt is dissolved, preferably at a mix rate of about 100 to 300 rpm. Further additions of the salt solution may be used following collapse of the emulsion to adjust the final, inventive composition to desired solids ranges, and additional surfactant may be added if desired.

Suitable water soluble salts include: alkali metal carbonates, such as sodium carbonate; alkali metal halides, such as sodium chloride; alkaline earth halides, such as calcium chloride; alkali metal hypohalites, such as sodium hypochlorite and lithium hypochlorite; alkaline earth hypohalites, such as calcium hypochlorite; alkali metal sulfates, such as sodium sulfate; and alkaline earth and multivalent sulfate salts, such as magnesium and aluminum sulfate. Particularly preferred is sodium hypochlorite.

It has been found that the salt should be slowly added into the emulsion. Too rapid addition tends to precipitate polymer in a curd-like form.

The following experimental methods, materials and results are described for purposes of illustrating the present invention. However, other aspects, advantages and modifications within the scope of the invention will be apparent to those skilled in the art to which the invention pertains.

EXPERIMENTAL

Cardipol LPO-25 (available from Bareco Co.) was utilized in preparing embodiments of the invention in which the polymer was an oxidized polyethylene. Cardipol was found to have a relatively low molecular weight, and samples with a range of saponification numbers 52–91 mg KOH/g and melting points 98°–115° C. were used.

Polyethylene-acrylic acid copolymers ("A-C" polyethylenes available from Allied) were found to have higher molecular weights with acid numbers ranging 40–120 mg KOH/g and melting points 92°–108° C.

The water soluble salt was provided by a liquid hypochlorite bleach containing sodium hypochlorite, and the surfactants chosen were stable to hypochlorite. Aqueous solutions of sodium hypochlorite are inherently basic, as sodium hypochlorite is the salt of a weak acid (hypochlorous acid) and a strong base (sodium hydroxide). Since it is well known that hypochlorite ion is stabilized by basic solutions, conventional aqueous hypochlorite bleach usually incorporates small amounts of sodium hydroxide or sodium carbonate, which adjust the solution to a pH of about 10.5 to 12.0. Aqueous hypochlorite bleaches can also include additional components and be of higher pH. However, it has been found that higher amounts of caustic, e.g., sodium hydroxide, will impart good chemical and physical stability to the compositions of the invention.

Examples I–VII illustrate suitable emulsions as precursors in making compositions in accordance with the present invention, and examples VIII through XVI illustrate preferred embodiments.

EXAMPLE I

Into a 1 liter three-neck flask equipped with condensor and mechanical stirrer was placed 100 g Cardipol LPO-25, 83 g sodium lauryl sulfate (30% active solution) and 6.8 g NaOH for saponification and neutralization. The mixture was stirred and heated on an oil bath at 120° C. until the polymer was melted and homogeneous. Boiling water was added in small portions (about 25 ml) with rapid stirring until there was a drop in viscosity. Additional hot water was added to bring the volume to 500 ml. The emulsion was allowed to cool to room temperature with stirring, filtered through a cheese cloth and stored.

Preferred ranges for the emulsion are:

| | |
|---|---|
| % Total solids | 22–25% |
| pH | 11.5–12.0 |
| Viscosity | 20 cps (Brookfield, 25° C.) |
| % Coagulum | less than about 3% |

EXAMPLE II

Three compositions (with varying amounts of an anionic surfactant) were prepared in a manner analogous to the preparation of Example I. Component weight percentages of the three emulsions wee as follows:

| Components | (a)wt. % | (b)wt. % | (c)wt. % |
|---|---|---|---|
| Polymer (oxidized polyethylene) | 20 | 20 | 20 |
| NaOH | 2 | 2 | 2 |
| sodium dodecyl diphenyloxide disulfonate* (45% soln) | 1.1 | 6.6 | 11.1 |
| Water | 75.9 | 70.4 | 65.9 |

*Dowfax 2A1, available from DOW Chemical Co.

EXAMPLE III

Another three emulsion compositions wee prepared having the component weight percentages as follows.

| Components | (a)wt. % | (b)wt. % | (c)wt. % |
|---|---|---|---|
| polymer (oxidized polyethylene) | 20 | 20 | 20 |
| NaOH | 2 | 2 | 2 |
| sodium lauryl sulfate* (30% soln) | 10 | 16.6 | 33.3 |
| Water | 67 | 60.4 | 43.7 |

*Equex S, available from Procter & Gamble

EXAMPLE IV

Similarly, two compositions having different ranges of a surfactant were prepared with the emulsion components as follows.

| Components | (a)wt. % | (b)wt. % |
|---|---|---|
| polymer (oxidized polyethylene) | 20 | 20 |
| NaOH | 2 | 2 |
| naphthalene sulfonate* (50% soln.) | 6 | 10 |
| Water | 72 | 68 |

*Petro AG Special, Petrochemicals Co.

EXAMPLE V

In an analogous manner, another emulsion was prepared with lauric acid as surfactant and having the following weight percentages.

| Components | wt. % |
|---|---|
| polymer (oxidized polyethylene | 20 |
| NaOH | 3 |
| Lauric Acid | 3 |
| Water | 74 |

EXAMPLE VI

Another emulsion (with a nonionic surfactant) was prepared having the component weight percentages and follows.

| Components | wt. % |
|---|---|
| polymer (oxidized polyethylene) | 20 |
| NaOH | 5 |
| linear, primary alcohol ethoxylate ($C_{12}$–$C_{15}$)* | 73 |

*Neodol 25-35, Available from Shell Chemical

In a manner similar to emulsification of oxidized polyethylenes (as in Example I), stable emulsions utilizing polyethylene-acrylic acid copolymers were prepared from neutralized A-C580 polymer with equivalents of NaOH (1.3 mgNaOH/g A-C580) added for neutralization. Examples VII and VIII characterize emulsions with neutralized polyethylene-acrylic acid copolymer and two different surfactants.

EXAMPLE VII

| Wt. % polymer | Wt. % Surfactant[1] | Wt. % Total Solids | pH |
|---|---|---|---|
| 10 | 3.3 | 11.8 | 02.1 |
| 10 | 8.3 | 13.4 | 11.8 |
| 10 | 16.6 | 16.1 | 12.1 |
| 10 | 33.3 | 22.0 | 11.2 |
| **Wt. % polymer** | **Wt. % Surfactant[2]** | **Wt. % Total Solids** | **pH** |
| 10 | 2.2 | 12.7 | 12.0 |
| 10 | 5.5 | 12.6 | 11.8 |
| 10 | 22.2 | 21.1 | 11.8 |

[1]sodium lauryl sulfate (30% solution)
[2]sodium dodecyl diphenyloxide disulfonate (45% solution)

EXAMPLE VIII

Preparation of a Stable Suspension of Brightener in Chlorine Bleach Solution An emulsion was first prepared as follows. To a flask equipped with a condenser and a paddle-blade stirrer was added 10 g. A-C 580 polymer (Allied Chemical Corp., Morristown, New Jersey), 0.5 g NaOH and 5.3 g Dowfax 2Al (sodium dodecyl diphenyloxide disulfonate, an anionic surfactant obtained from Dow Chemical Co., Midland, Mich.). The contents were then heated with an oil bath set at 120° C. until, after about fifteen minutes, there was a viscous melt. Slowly and with continuous agitation, 84.2 g boiling water was added. The oil bath was then replaced with an ice bath and the emulsion was stirred until it cooled to room temperature. The emulsion was filtered through cheese cloth, bottled, and stored.

To 0.2 g Tinopal CBS-X (a fluorescent whitening agent obtained from Ciba-Geigy Corporation in Greensboro, N.C.; "Tinopal" is a registered trademark of Ciba-Geigy) dissolved in 6.0 g water was added 5.0 g of the above emulsion. In a separate beaker, 4.0 g of a 50 wt.% NaOH solution was mixed with 184.8 g of a liquid hypochlorite bleach solution (having a sodium hypochlorite concentration of about 5.25 wt.%). This bleach solution was then added slowly with agitation to the emulsion and brightener precipitate upon addition of the bleach leading to a stable yellow, opaque colloid. This resultant solution is thus a stable suspension of a fluorescent whitening agent in chlorine bleach.

EXAMPLE IX

Preparation of a Stable Suspension of Bluing Agents and Brightener in Chlorine Bleach Solution An emulsion was prepared in the same manner as described in Example I, with 10.0 g A-C 580, 0.5 g NaOH and 4.4 g Dowfax 2Al and 85.1 g water.

Tinopal CBS-X (0.2 g) was dissolved in 6.0 g water and 0.2 g ultramarine blue was added and dispersed in the solution with the aid of sonication. The above emulsion, 17.0 g, was then mixed well with the ultramarine blue and CBS-X mixture, followed by the addition of 176.6 g of liquid hypochlorite bleach solution containing 0.5 wt.% NaOH. A stable light blue colloid was formed, indicating a stable suspension of both brightener and bluing agent in chlorine bleach.

EXAMPLE X

Brightener may also be added during emulsification of the polymer resulting in an emulsion containing CBS-X. This emulsion can then be used in dispersing the ultramarine blue in liquid hypochlorite bleach solution.

The emulsion was prepared in the same manner as described in Example II with the exception that 1.3 g of CBS-X were added to the polymer melt before the addition of water.

The liquid hypochlorite bleach dispersion was then prepared in the same manner as described in Example II using the above emulsion with the exception of omitting the addition of 0.2 g of CBS-X.

As noted earlier, compositions prepared in accordance with the present invention may include alkaline earth or alkaline metal salts of brighteners. These salts may be prepared as follows.

EXAMPLE XI

The calcium salt of CBS-X was prepared by adding 10 ml of a 10 wt.% $CaCl_2$ solution to 5 g CBS-X dissolved in 150 ml of water. The precipitate that was formed was filtered and dried.

EXAMPLE XII

The zinc salt of CBS-X was prepared by adding 25 ml of a 5 wt.% $ZnCl_2$ solution to 5 g CBS-X in 150 ml water. The precipitate was filtered and dried.

EXAMPLE XIII

The magnesium salt of CBS-X was prepared by adding 11 ml of a 5 wt.% $MgSO_4$ solution to 5.0 g CBS-X in 150 ml water. The precipitate was filtered and dried.

EXAMPLE XIV

The barium salt of CBS-X was prepared by adding 27 ml of a 5 wt.% $BaCl_2$ solution to 3.0 g CBS-X in 100 ml water. The precipitate was filtered and dried.

EXAMPLE XV

The aluminum salt of CBS-X was prepared by adding 14 ml of a 10 wt.% solution of $Al_2(SO_4)_3.18H_2O$ solution to 2 g CBS-X in 75 ml $H_2O$. The precipitate was filtered and dried.

EXAMPLE XVI

Testing of physical and chemical stability was done on a bleach composition containing both brightener and ultramarine blue. The composition was composed of the following: 0.1 wt.% ultramarine blue, 0.1 wt.% Tinopal CBS-X, 0.60 wt.% A-C 580 polymer, 0.12 wt.% Dowfax 2Al surfactant, 1.0 wt.% NaOH, 5.2 wt.% NaOCl, 4.1 wt.% NaCl, and 88.78 wt.% water.

The sample was physically stable for 9 weeks at 120° F. It was unstable, i.e. showed some signs of irreversible phase separation, when measured at 12 weeks at 120° F. Measurements were not made after 12 weeks. However, the composition was stable for 12 weeks at both 70° F. and 100° F. An approximation based on previous work estimates physical stability as between about 6 months and 1 year at 70° F.

Chemical stability was evaluated as follows. After twelve weeks of storage, the percentage of original sodium hypochlorite remaining in solution was measured at various temperatures. At 40° F., 98.0 % was retained; at 70° F., 92.9%; at 100° F., 62.2%; and at 120° F., 23.9%. Thus, the composition shows substantial chemical stability at ordinary and even at slightly elevated temperatures.

Chemical stability was also evaluated in terms of fluorescence stability. After 12 weeks of storage, the percentage of the original intensity remaining was calculated: at 40° F. and at 70° F., 100% was retained; at 100° F., 64%; and at 120° F., 0%. Thus, fluorescence stability is also maintained at ordinary as well as at somewhat elevated temperatures.

While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

What is claimed is:

1. A liquid composition, useful for bleaching and brightening fabrics, formed by the steps comprising:

admixing a quantity of molten polymer, said polymer consisting essentially of oxidized polyethylene having a molecular weight between about 400 and about 3,000 or polyethylene-acrylic acid copolymer having a molecular weight between about 500 and 6,000, with sufficient base to saponify and neutralize said oxidized polyethylene or to neutralize said polyethylene-acrylic acid copolymer;

containing said molten polymer in the presence of an anionic or a nonionic surfactant with sufficient of an aqueous solution to form an emulsion;

dispersing a quantity of fluorescent whitening agent in said emulsion, said agent being in a weight ratio with respect to the emulsified polymer of from about 1:1.5 to about 1:3; and slowly adding a water soluble salt to the dispersed fluorescent whitening agent and emulsified polymer at least until the emulsion collapses, wherein the polymer forms a matrix in which particles of the fluorescent whitening agent are entrapped.

2. The liquid composition as in claim 1, wherein said ratio of said fluorescent whitening agent to said emulsified polymer is approximately 1:2.5.

3. The liquid composition as in claim 1 wherein said dispersing step further includes dispersing a quantity of particulate pigment in said emulsion, said pigment being in a weight ratio with respect to the emulsified polymer of from about 1:2 to about 1:8.

4. The liquid composition as in claim 1 wherein:

the water soluble salt is selected from the group consisting essentially of: alkali metal carbonates; alkali metal, alkaline earth and multivalent sulfates; alkali metal and alkaline earth halides; alkali metal and alkaline earth hypohalites; and mixtures thereof.

5. The liquid composition as in claim 1 wherein the particulate pigment includes ultramarine blue.

6. The liquid composition as in claim 1, wherein the fluorescent whitening agent is selected from the group consisting essentially of distyrylbiphenyl derivatives, stilbene derivatives, the alkali metal salts thereof, the multivalent salts thereof, and mixtures thereof.

7. The liquid composition as in claim 6, wherein the fluorescent whitening agent is at least one multivalent salt of a distyrylbiphenyl derivative, said salt selected from the group consisting of alkaline earth, zinc, Group IIIA metal salts and mixtures thereof.

8. A method for producing a bleaching and brightening composition comprising the steps of:

admixing a quantity of molten polymer, said polymer consisting essentially of oxidized polyethylene or polyethylene-acrylic acid copolymer, with sufficient base to saponify and neutralize said oxidized polyethylene or to neutralize said polyethylene-acrylic acid copolymer;

contacting said neutralized or neutralized and saponified molten polymer in the presence of an anionic or a nonionic surfactant with sufficient of an aqueous solution to form an emulsion;

dispersing a quantity of fluorescent whitening agent in said emulsion, the fluorescent whitening agent being in a weight ratio with respect to the emulsified polymer of from about 1:1.5 to about 1:3; and, slowing adding sodium hypochlorite dissolved in an aqueous solution to the dispersion fluorescent whitening agent and emulsified polymer until the emulsion collapses, wherein the polymer forms a matrix in which particles of the fluorescent whitening agent are entrapped.

9. The method of claim 8, wherein said dispersing step further includes dispersing a quantity of particulate ultramarine blue in said emulsion, the ultramarine blue being in a weight ratio with respect to the emulsified polymer of from about 1:2 to about 1:8.

* * * * *